United States Patent [19]
Decker et al.

[11] Patent Number: 6,133,384
[45] Date of Patent: Oct. 17, 2000

[54] WRINKLED EPOXY POWDER COATING WITH METHYLENEDISALICYLIC ACID, ITS HOMOLOG AND LEWIS ACID

[75] Inventors: Owen H. Decker, Wyomissing; Charles P. Tarnoski, Sinking Spring, both of Pa.

[73] Assignee: Morton International Inc., Chicago, Ill.

[21] Appl. No.: 09/255,084

[22] Filed: Feb. 22, 1999

Related U.S. Application Data

[62] Division of application No. 08/992,997, Dec. 18, 1997, Pat. No. 5,932,288.

[51] Int. Cl.⁷ .......................... B05D 03/02; B05D 05/02; C08L 63/00
[52] U.S. Cl. .......................... 525/533; 427/375; 427/386; 525/934
[58] Field of Search ..................... 525/533, 934; 427/375, 386

[56] References Cited

U.S. PATENT DOCUMENTS

| | | | |
|---|---|---|---|
| 2,918,491 | 12/1959 | Radue | 260/474 |
| 3,458,566 | 7/1969 | Yakimik | 260/521 |
| 3,468,942 | 9/1969 | Blum | 260/520 |
| 3,557,198 | 1/1971 | Yakimik | 427/521 |
| 3,639,928 | 2/1972 | Bentley et al. | 260/47 |
| 3,954,898 | 5/1976 | Hirota et al. | 260/837 |
| 3,996,175 | 12/1976 | Schreiber et al. | 260/28 |
| 4,094,721 | 6/1978 | Sturm et al. | 156/309 |
| 4,264,758 | 4/1981 | Waddill | 524/100 |
| 4,271,277 | 6/1981 | Golownia | 525/351 |
| 4,341,819 | 7/1982 | Schreffler et al. | 528/195 |
| 4,419,477 | 12/1983 | Saeki et al. | 525/290 |
| 4,528,127 | 7/1985 | Holderegger et al. | 525/530 |
| 4,556,693 | 12/1985 | Corcoran et al. | 525/162 |
| 4,599,401 | 7/1986 | Koleske | 528/408 |
| 4,677,170 | 6/1987 | Monnier et al. | 526/539 |
| 4,701,378 | 10/1987 | Bagga et al. | 428/414 |
| 4,751,112 | 6/1988 | Smith, Jr. et al. | 427/388.3 |
| 4,757,117 | 7/1988 | Moss | 525/483 |
| 4,997,951 | 3/1991 | Bagga | 548/352 |
| 5,021,513 | 6/1991 | Bagga | 525/325.8 |
| 5,115,025 | 5/1992 | Koleske et al. | 525/162 |
| 5,115,083 | 5/1992 | Piedrahita et al. | 528/230 |
| 5,124,405 | 6/1992 | Erickson | 525/92 |
| 5,212,263 | 5/1993 | Schreffler | 525/533 |
| 5,256,713 | 10/1993 | Jacobs, III et al. | 524/99 |
| 5,447,751 | 9/1995 | Horinka et al. | 427/257 |
| 5,688,878 | 11/1997 | Decker et al. | 525/533 |

FOREIGN PATENT DOCUMENTS

| | | |
|---|---|---|
| AO195660 | 9/1986 | European Pat. Off. . |
| 5-271577 | 10/1993 | Japan . |

OTHER PUBLICATIONS

CA Selects: Coatings, Inks, & Related Products. Issue 22, 1993, p. 7 119: 182962w.
Research Disclosure: Jul. 1993 No. 351, pp. 457–459.
Modern Paint and Coatings, Oct. 1980, pp. 88–92 (Formulation Techniques Using Triflic Acid Salts).
Journal of Paint Technology, vol. 44, No. 565, Feb. 1972 (Powder Coating: Why–How–When).

*Primary Examiner*—Robert E. L. Sellers

[57] ABSTRACT

An epoxy coating powder composition and a method for controlling the denseness of cured wrinkle finish patterns are provided by the use of a curing agent mixture comprising a blocked Lewis acid, methylenedisalicylic acid and a ring-substituted homolog thereof having the formula

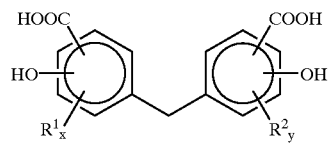

wherein x and y are from 1 to 3, and $R^1$ and $R^2$ are, independently, hydrogen, alkyl groups having from 1 to 20 carbon atoms, aryl groups having from 6 to 10 carbon atoms, or aryl-substituted methylene groups; with the proviso that when $x=y=3$, $R^1$ and $R^2 \neq$ hydrogen;

wherein the ratio of methylene disalicylic acid and the ring-substituted homolog is from about 50:50 to about 2:98 by weight.

11 Claims, 5 Drawing Sheets

6,133,384

1

WRINKLED EPOXY POWDER COATING WITH METHYLENEDISALICYLIC ACID, ITS HOMOLOG AND LEWIS ACID

This application is a divisional of application Ser. No. 08/992,997 filed Dec. 18, 1997, U.S. Pat. No. 5,932,288.

This invention relates to coatings applied by fusion coating processes and more particularly to coating powders that yield wrinkle finishes upon curing. It relates still more particularly to such powders made from thermosettable epoxy powder coatings having wrinkle finish patterns that may be controlled by varying the proportions of two or more discrete carboxylic acid curing agents.

BACKGROUND OF THE INVENTION

The coating compositions of this invention are dry, free flowing powders that may be used in fusion coating processes. A fusion coating process is herein defined as a process in which a coating powder is distributed over a substrate and heat, supplied from the substrate or an external source, fuses the powder into a continuous film. Examples of fusion coating processes include those in which the powder is applied in a fluidized bed or a cloud chamber, by electrostatic spraying and hot flocking, When the coating powder is based upon heat curing resins, as is the case of the epoxy-functional resins of this invention, sufficient heat in excess of that required to fuse the powder must be available to cure the coating and fully develop its physical and chemical properties.

Wrinkle finishes, as contemplated for the purposes of this invention, are reticulated, i.e., made up of patterns of raised veins of varying heights across the surface as shown in the drawings. Thus, a wrinkle pattern may be spoken of as deep or shallow.

Wrinkle finishes are desired in many applications and are commonly applied to office equipment such as word processing system components, typewriters, staplers, filing cabinets, and the like. In addition to being aesthetically pleasing, these finishes can provide certain utilitarian advantages in that they are of relatively low gloss and even thin films can hide the presence of defects in the surface of a substrate such as scratches and welding scars.

Epoxy resin-based powder coatings having wrinkle finishes are taught by Schreffler et al in U.S. Pat. Nos. 4,341,819 and 5,212,263, the teachings of which are incorporated herein by reference. The coating powders disclosed therein achieve the wrinkle finish by means of a special curing agent, methylenedisalicylic acid (MDSA), and a blocked Lewis acid acting on the epoxy groups of the resin. It is believed, however, that the wrinkle pattern taught by Schreffler et al is produced as a consequence of competing reactions: the Lewis acid catalyzed self-curing of the epoxy resin and the carboxylic acid curing of the epoxy resin. The wrinkle finishes obtained by the MDSA cure of epoxy powder coatings have fine, densely spaced veins with little variation in appearance, gloss, or light reflectance. Some MDSA-cured wrinkle finishes have poorly developed patterns caused by filler and pigment interference with the curing reaction.

The coating powders disclosed in commonly assigned. co-pending application Ser. No. 650,081, filed May 17, 1996 achieve a wrinkle finish by means of a ring-substituted homolog of the methylene disalicylic acid such as a methylene bis(alkylsalicylic acid) as a curing agent acting on the epoxy groups of the resin in conjunction with a blocked Lewis acid. The teachings of application Ser. No. 650,081

2 are incorporated herein by reference. The wrinkle finishes produced when a curing agent disclosed in said application, methylene bis(3-methylsalicylic acid) or M3MA, is used in the curing of epoxy powder coatings have bold, thick, broadly spaced veins and are characterized by a different set of appearance, gloss, and light reflectance properties.

There is a demand and a need for an epoxy powder coating system which will provide a range of patterns intermediate the fine and bold patterns of the MDSA and M3MA finishes.

There is also a demand for wrinkle finishes having fine patterns that are more visible than those achieved with the MDSA cure.

SUMMARY OF THE INVENTION

A general object of the invention is to provide an epoxy powder coating system that provides wrinkle finishes of variable pattern densities.

A more specific objective of the invention is to provide a method for controlling the size and shape of the patterns while curing a wrinkle finish powder coating.

These and other objects of the invention which will become apparent from the following description and drawings are achieved by the use of mixtures of the MDSA and a ring-substituted homolog thereof as curing agents having MDSA/homolog ratios of from 50:50 to 2:98 by weight in the epoxy resin coating powders. At an MDSA/homolog ratio between 99:1 and 50:50, the wrinkle pattern achieved is not distinguishable by the naked eye from that obtained with MDSA alone and, likewise, at an MDSA/homolog ratio between 1:99 and 0:100, the wrinkle pattern obtained is not distinguishable by the naked eye from that obtained with the homolog alone. The proportion of M3MA that is necessary to produce a wrinkle finish having a density midway between the two extremes is much larger than 50% by weight.

Without limiting the invention claimed herein in any way, it is believed that the differences in the density of the wrinkle patterns produced by the MDSA and its ring-substituted homolog result from differences in the temperature at which each curing agent reacts. Wrinkles in general develop when cure reactions produce less shrinkage of the surface layer of a coating than of the bulk. Temperature-ramped differential scanning calorimetry indicates that the blocked Lewis acid used herein catalyzes epoxy condensations about 155° C., while the addition reaction of MDSA and epoxies peaks at 190° C. and the addition reaction of M3MA and epoxies peaks at 220° C. Increasing the level of M3MA in an MDSA/M3MA blend delays the addition reactions, presumably allowing time for the formation of a thick surface layer by Lewis acid-catalyzed condensations before the addition reactions occur to cure the bulk. This thicker surface layer produces a broader, deeper wrinkle pattern than the thin surface layer produced using higher proportions of MDSA. The blocked Lewis acid preferentially catalyzes epoxy reactions at the surface of a coating because the blocking/unblocking reaction of the Lewis acid and its amine blocker is reversible. Evolution of the amine blocker from the surface of the coating minimizes the reverse reaction. In the bulk, significant reverse reaction occurs, limiting the effective concentration of the catalyst. It has been observed that wrinkles fail to develop in this and in the Schreffler et al system when air exchange in a cure oven is impaired.

BRIEF DESCRIPTION OF THE DRAWINGS

The density of the patterns created by the mixtures of various proportions of curing agents is illustrated by the scanning electron microphotographs (magnification 20×) labeled FIGS. 1 through 5.

DETAILED DESCRIPTION OF THE INVENTION

Figure 1:
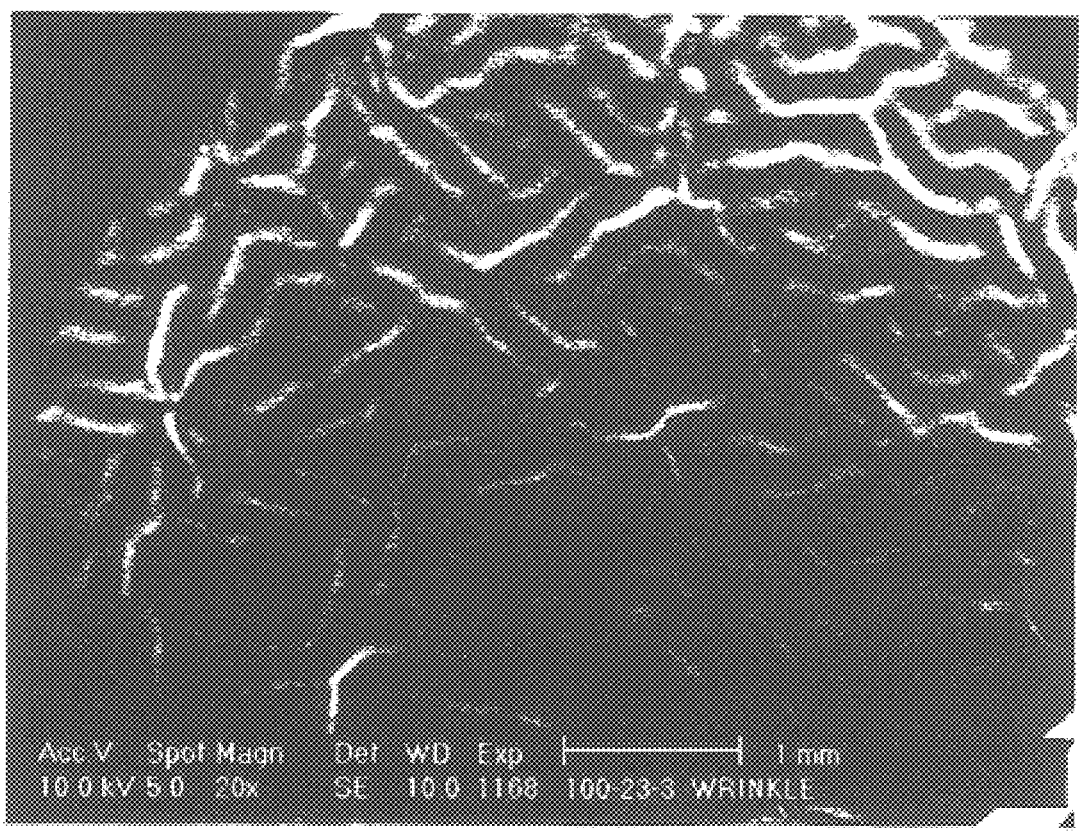
FIGS. 1 and 5 are microphotographs of the wrinkle patterns of Comparative Examples 1 and 2 (Prior Art).
Figure 2:
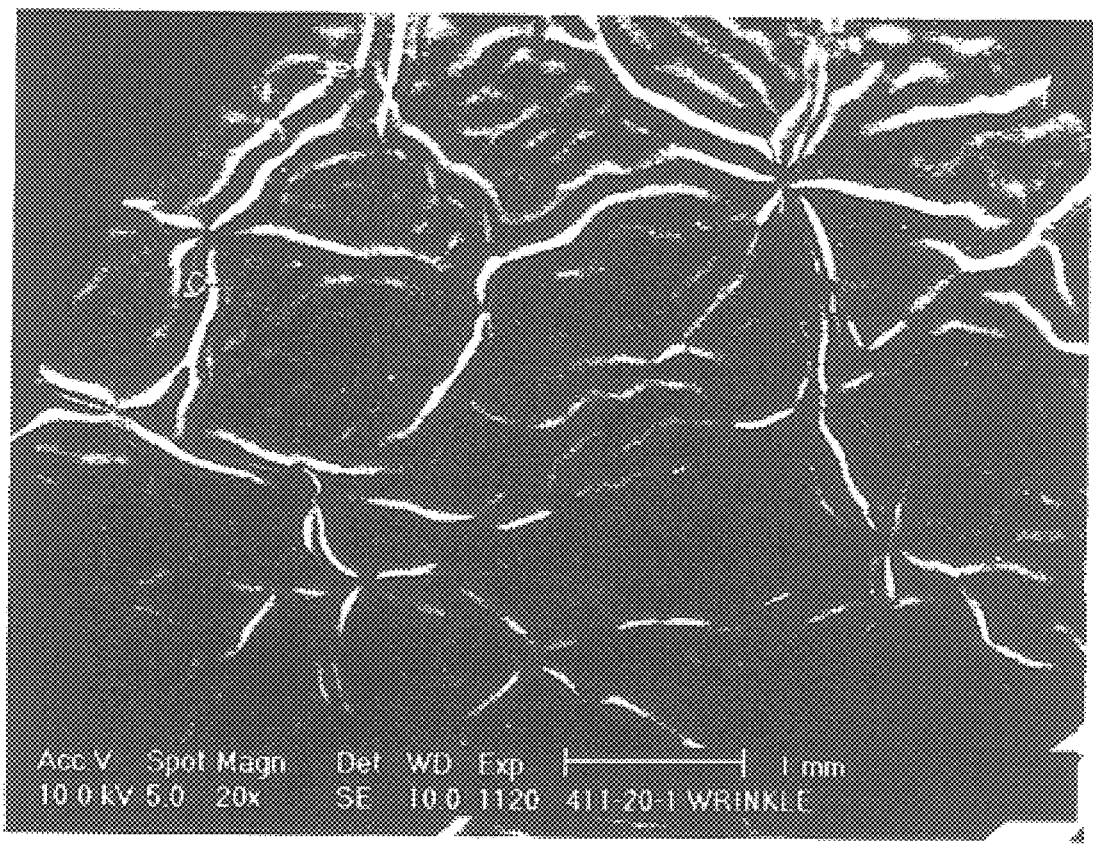
FIGS. 2–4 are microphotographs of the wrinkle pattern of Examples 1–3 of this invention.
Figure 3:
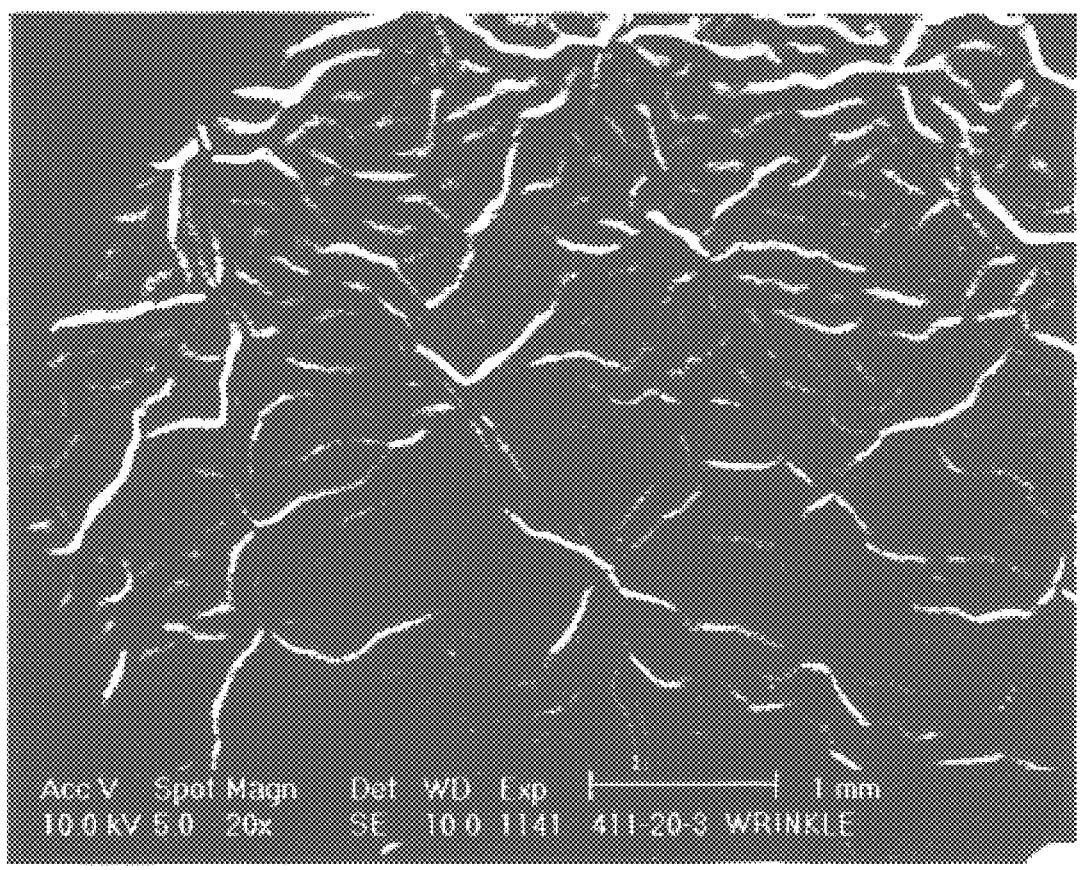
Figure 4:
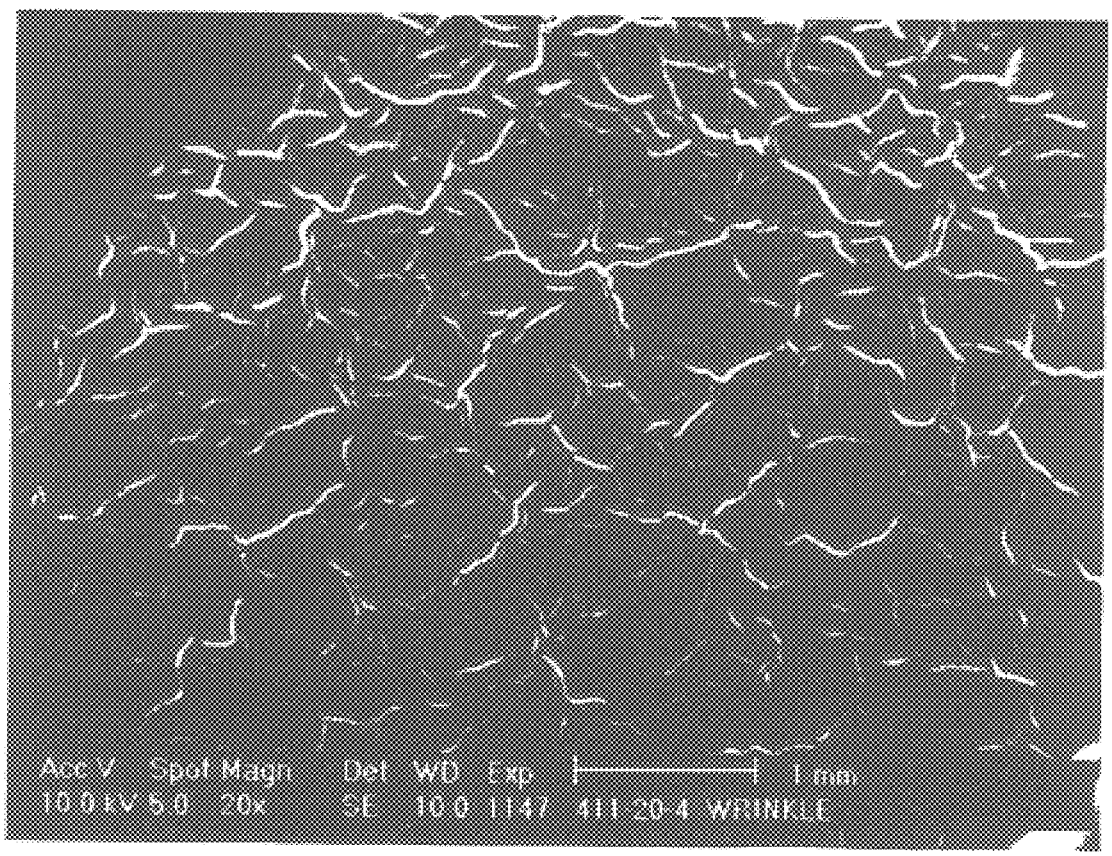
Figure 5:
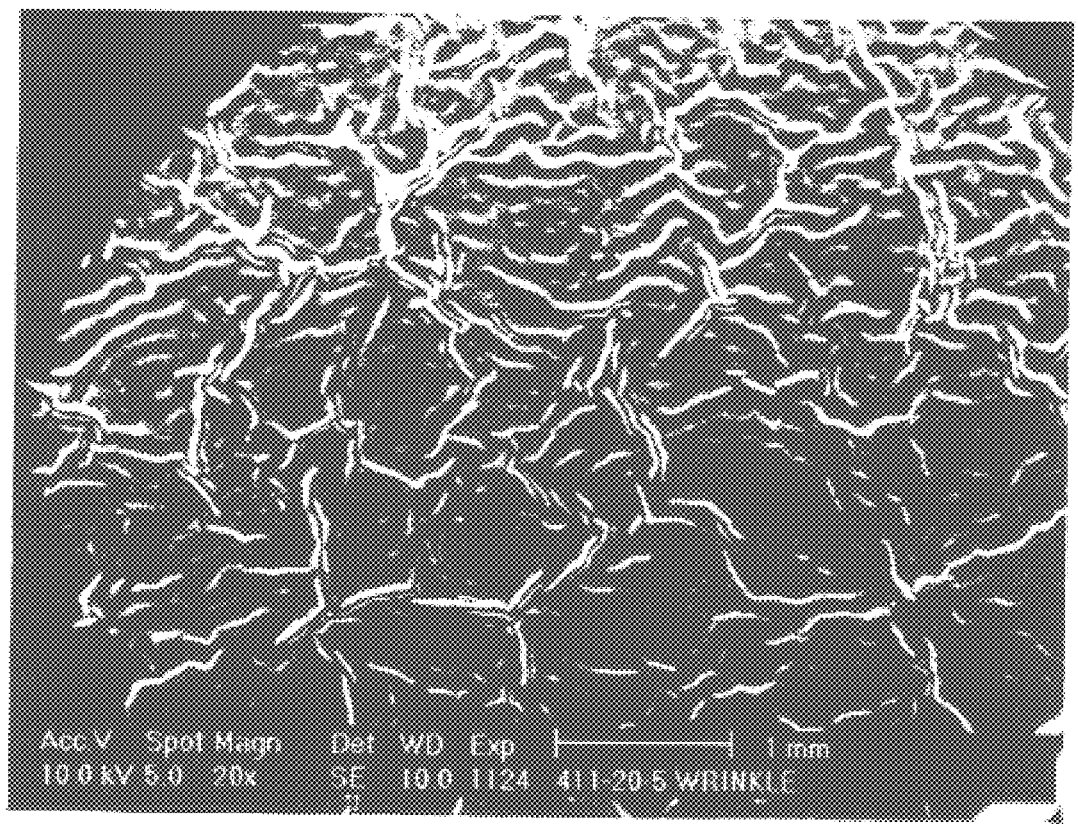

As used herein, references to "phr" are to be understood to refer to its usual sense as meaning parts per hundred parts resin, by weight.

The method of this invention for obtaining a wrinkled finish on a substrate surface includes the step of applying onto the substrate surface a coating powder which includes an epoxy resin, a blocked Lewis acid, and from about 10 phr to about 20 phr, preferably from about 12 phr to about 18 phr, of the mixture of MDSA and a ring-substituted homolog thereof as a curing agent wherein the MDSA/homolog ratio is from about 50:50 to about 2:98 by weight, and heating the composition to fuse it and cure it. A preferred MDSA/homolog ratio ranges from about 25:75 to about 5:95 by weight. A suitable range for the time and temperature during the heating step is from about 150° C. for 20 minutes to about 200° C. for 10 minutes but there is no great criticality in that range.

The invention further comprehends a coating powder composition adapted to provide a wrinkle finish and which composition includes an epoxy resin, a blocked Lewis acid, and from about 10 phr to about 20 phr, preferably from about 12 phr to about 18 phr, of a mixture of MDSA and a ring-substituted homolog thereof wherein the MDSA/homolog ratio ranges from about 50:50 to about 2:98 by weight, preferably from about 25:75 to about 5:95 by weight.

The hot plate melt flow test is a combined measure of the reactivity and melt flow viscosity of coating powder compositions. In it, a pellet of powder having a diameter of 12.7 mm and 6 mm thick is placed on a hot plate at 375° F. (190±2° C.) at an inclination angle of 35°. The length of flow is measured after the pellet melts and runs down the incline. The hot plate melt flow of the coating powder composition of this invention should be in the range of from about 20 mm to about 80 mm.

For the purposes of this invention, the term methylenedisalicylic acid (or MDSA) means methylenedisalicylic acid, itself, as well as isomers thereof produced by the sulfuric acid-catalyzed reaction of salicylic acid with formaldehyde, including 3,5-bis[(3-carboxy-4-hydroxyphenyl)methyl]-2-hydroxybenzoic acid; 5-[3-carboxy-2-hydroxyphenyl)methyl]-3-[(3-carboxy-4-hydroxyphenyl)methyl]-2-hydroxybenzoic acid; 3-[3-carboxy-2-hydroxyphenyl)methyl]-5-[(3-carboxy-4-hydroxyphenyl)methyl]-2-hydroxybenzoic acid; and 3,5-bis[(3-carboxy-2-hydroxyphenyl)methyl]-2-hydroxybenzoic acid. As so made, methylenedisalicylic acid often contains an unsatisfactorily large amount of residual sulfuric acid, expressed in the co-pending Decker et al application by a cation to sulfur equivalent ratio of less than about 0.4. It is preferred for the purposes of this invention to use the improved MDSA of Decker et al wherein the cation to sulfur equivalent ratio is greater than about 0.4 and no more than about 3. An even more fully purified MDSA containing no residual sulfur compounds is, of course, more preferred.

For the purposes of this invention, the ring-substituted homolog of MDSA has a structure in general accordance with the following formula:

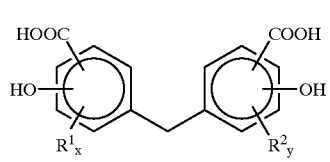

Formula I wherein x and y are independently from 1 to 3, and $R^1$ and $R^2$ are, independently, hydrogen, alkyl groups having from 1 to 20 carbon atoms, aryl groups having from 6 to 10 carbon atoms, or aryl-substituted methylene groups, with the proviso that when x=y=3, $R^1$ and $R^2 \neq$ hydrogen. The methylene bis(alkylsalicylic acid) and other ring-substituted homologs of MDSA are made by the sulfuric acid-catalyzed reaction of formaldehyde with an alkyl- or aryl-substituted salicylic acid and, optionally, a parahydroxybenzoic acid with or without such ring substituents. It is preferable that the caustic wash of the co-pending Decker et al application be used so that the cation to sulfur equivalent ratio is greater than about 0.4 [and no more than about 3]. More highly purified homologs are, of course, more preferred. Various techniques can be used to measure the quantities of metal ions and sulfur in MDSA and M3MA samples. One such useful technique is referred to as inductively coupled plasma analysis (ICPA).

A preferred homolog has the structure of Formula I wherein wherein at least one of $R^1$ and $R^2$ is an alkyl group, more preferably, an alkyl group having from 1 to 3 carbon atoms. M3MA is a particularly preferred homolog for the purposes of this invention.

The epoxy resins used in the invention include Bisphenol A type epoxies with epoxide equivalent weights of between about 600 and about 1100, or mixtures of such epoxies. Preferably, the major portion, i.e., over about 50% of the epoxy resin, is an epoxy resin with an equivalent weight between about 600 and 750. Resins sold under the trademarks ARALDITE GT-7013 and GT-9496 by Ciba-Geigy are examples of suitable epoxy resins for this invention.

The blocked Lewis acid is typically utilized in this invention at a level of from about 0.3 phr to about 1.5 phr, preferably at a level of from about 0.5 phr to about 1 phr. A boron trichloride amine complex is an example of a blocked Lewis acid suitable for this invention.

The coating powder compositions of the invention may be clear, i.e., non-pigment-loaded, or may contain from 0 phr up to about 200 phr (though generally 120 phr or less) of filler and/or pigment, relative to the weight of the total of the epoxy-functional resin. The melt viscosity of the composition is generally increased by fillers, depending on the amount used, the particle size, the surface area and the surface chemistry of the fillers. The coating composition also may contain conventional additives such as antioxidants, light stabilizers, flow modifiers, and co-stabilizers, generally at a level of about 10 phr or less.

Coating powders in accordance with the present invention can be formed in a conventional manner. For example, the components of the coating composition are combined and blended for about 15 minutes. The blended materials are then extruded, e.g., at 110° C. in a single screw or twin screw extruder, ground and screened to obtain a powder of appropriate particle size. Scalping at 60 mesh is typical to remove coarse particles. Average particle size is typically 20–80 microns. Typically, about 10% by weight of the particles are less than 10 microns. The amount of material retained on a 325 mesh is typically between about 30 and 50 wt. %. The powder is then applied in a conventional manner, e.g., electrostatically, to a substrate. The substrate is heated at the time of application and/or subsequently so that the coating particles melt, form a continuous film, and cure.

The present invention is described in further detail in connection with the following examples which illustrate various aspects involved in the practice of the invention. It is to be understood that all changes that come within the spirit of the invention are desired to be protected and thus the invention is not to be construed as limited by these examples.

CURING AGENT PREPARATION EXAMPLES

Example A
Methylene bis-(3-methylsalicylic acid) (M3MA)

The components listed in TABLE 1, below, were added to a stirred glass one liter reactor under a nitrogen atmosphere to form a slurry. The slurry was heated to 100° C., stirred for 17 hrs, cooled to 30° C., and filtered to yield an acid-wet cake. The acid-wet cake was suspended in 1600 ml of water and then titrated to pH 3.1 with 25% aqueous NaOH to form a new slurry. This slurry was then filtered, and washed with 2000 ml of de-ionized water to form a washed cake. The washed cake was dried 12 hours at 60° C. in an air circulating oven to form an off-white powder weighing 197.4 g.

Example B
Methylene disalicylic acid

The components listed in TABLE 1, below, were added to a stirred, glass one-liter reactor under a nitrogen atmosphere to form a slurry. The slurry was heated to 100° C., stirred for 8 hours, cooled to 30° C., and filtered to yield an acid-wet cake. The acid-wet cake was washed with 270 ml of water, then suspended in 540 ml of water and neutralized to pH 3.0 with 25% aqueous NaOH to form a new slurry. This slurry was heated to 80° C., stirred at 80° C. for one hour, cooled to room temperature, filtered, and washed with an additional 270 ml water. The washed cake was then dried 14 hours at 50° C. in an air circulating oven to 284.1 g of off-white powdered MDSA.

TABLE 1

| COMPONENTS | AMOUNTS (grams) | |
|---|---|---|
| | Ex. A | Ex. B |
| Water | 404 | 354.6 |
| Sodium naphthalene sulfonate | 1.00 | 1.35 |
| Paraformaldehyde | 27.84 | 41.09 |
| Sulfuric acid | 128 | 112.00 |
| 3-Methylsalicylic acid | 200.0 | — |
| Salicylic acid | — | 270.00 |

COATING POWDER PREPARATION

Comparative Examples 1–2 and Examples 1–3

The components listed in Table 2 were compounded in an extruder, chilled, chipped, ground and sieved through a 60 mesh screen to prepare light blue coating powders identified herein as the products of Comparative Examples 1–2 and Examples 1–3. All parts are by weight. Each powder was electrostatically sprayed onto separate 32 mil thick mild steel panels (i.e., Q-panels) and fused and cured in an oven at 375° F. for 10 minutes to form a coating having a thickness of from 2.5 to 4 mils. The properties of the coatings are shown in Table 3.

TABLE 2

| Component | Comp. Ex. 1 | Ex. 1 | Ex. 2 | Ex. 3 | Comp. Ex. 2 |
|---|---|---|---|---|---|
| GT-7013 Epoxy Resin | 100 | 100 | 100 | 100 | 100 |
| MDSA | — | 0.5 | 2.0 | 8.0 | 16 |
| M3MA | 16 | 15.5 | 14.0 | 8.0 | — |
| Boron trichloride/ethyl amine | 0.5 | 0.5 | 0.5 | 0.5 | 0.5 |
| Barium sulfate filler (Hitox) | 4.5 | 4.5 | 4.5 | 4.5 | 4.5 |
| Flow modifier (RESIFLOW 67) | 1.5 | 1.5 | 1.5 | 1.5 | 1.5 |
| TiO$_2$ (R-902) Dupont | 5.0 | 5.0 | 5.0 | 5.0 | 5.0 |
| Blue pigment (B28401, Select) | 3.0 | 3.0 | 3.0 | 3.0 | 3.0 |
| Blue pigment (G-58, Ferro) | 0.5 | 0.5 | 0.5 | 0.5 | 0.5 |

TABLE 3

| Test/Property | Comp. Ex. 1 | Ex. 1 | Ex. 2 | Ex. 3 | Comp. Ex. 2 |
|---|---|---|---|---|---|
| Wrinkle Width[1] (mm) | 0.31 | 0.21 | 0.19 | 0.14 | 0.15 |
| Wrinkle Shape[2] | Smooth | Smooth | Kinked | Highly Kinked | Highly Kinked |

[1]Wrinkle width was determined from the microphotographs in the drawings by counting the number of wrinkles crossed in a 4 mm length. For example:
$$\frac{4 \text{ mm}}{13 \text{ wrinkles}} = 0.31$$
[2]Wrinkle shape was determined from the photomicrographs. The foregoing detailed description is given for clearness of understanding only, and no unnecessary limitations are to be understood therefrom, as modifications within the scope of the invention will be obvious to those skilled in the art.

What is claimed is:

1. In a powdered coating composition adapted to provide a wrinkled finish, said composition comprising an epoxy resin, and a curing agent, the improvement characterized in that the curing agent is a mixture of:

a blocked Lewis acid;

methylenedisalicylic acid;

a ring-substituted homolog thereof having a general structure according to the formula

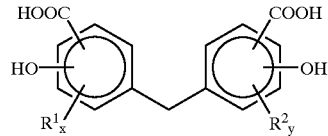

wherein x and y are from 1 to 3, and $R^1$ and $R^2$ are, independently, hydrogen, alkyl groups at least one of $R^1$ and $R^2 \neq$ hydrogen having from 1 to 20 carbon atoms, aryl groups having from 6 to 10 carbon atoms, or aryl-substituted methylene groups at least one of $R^1$ and $R^2 \neq$ hydrogen; with the proviso that when x=y=3, $R^1$ and $R^2 \neq$ hydrogen;

wherein the ratio of methylene disalicylic acid and the ring-substituted homolog is from about 50:50 to about 2:98 by weight.

2. The composition of claim 1 wherein both of the $R^1$ and $R^2$ groups are alkyl.

3. The composition of claim 1 containing from about 10 phr to about 20 phr of a mixture of methylenedisalicylic acid and the ring-substituted homolog thereof.

4. The composition of claim 3 containing from about 12 phr to about 18 phr of said mixture.

5. The composition of claim 1 containing from about 0.3 phr to about 1.5 phr of the blocked Lewis acid.

6. The composition of claim 1 containing from about 0.5 phr to about 1 phr of the blocked Lewis acid.

7. The composition of claim 2 containing from about 10 phr to about 20 phr of a mixture of methylenedisalicylic acid and the ring-substituted homolog thereof.

8. The composition of claim 7 containing from about 12 phr to about 18 phr of said mixture.

9. The composition of claim 2 containing from about 0.3 phr to about 1.5 phr of the blocked Lewis acid.

10. The composition of claim 2 containing from about 0.5 phr to about 1 phr of the blocked Lewis acid.

11. The composition of claim 1 wherein at least one of the $R^1$ and $R^2$ groups is alkyl.

* * * * *